3,412,003
METHOD FOR REMOVING OIL AND FOREIGN BODIES FROM WATER
Toshiyuki Tokumoto, Moricuchi, Osaka, Japan, assignor of one-half interest to Hiroji Yamada, Osaka, Japan
Original application June 11, 1962, Ser. No. 201,705. Divided and this application Oct. 22, 1965, Ser. No. 517,163
Claims priority, application Japan, June 12, 1961, 36/20,980; May 2, 1962, 37/18,034
3 Claims. (Cl. 204—186)

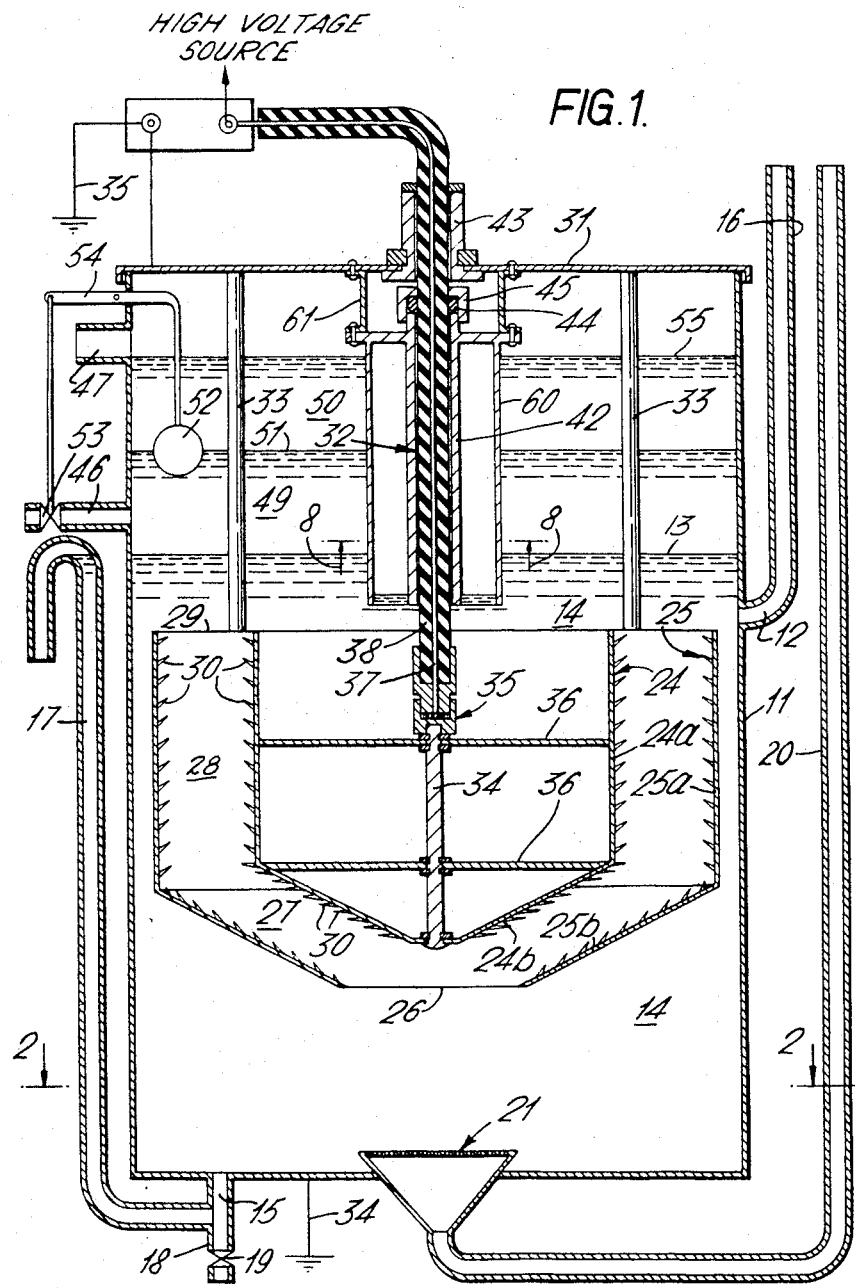

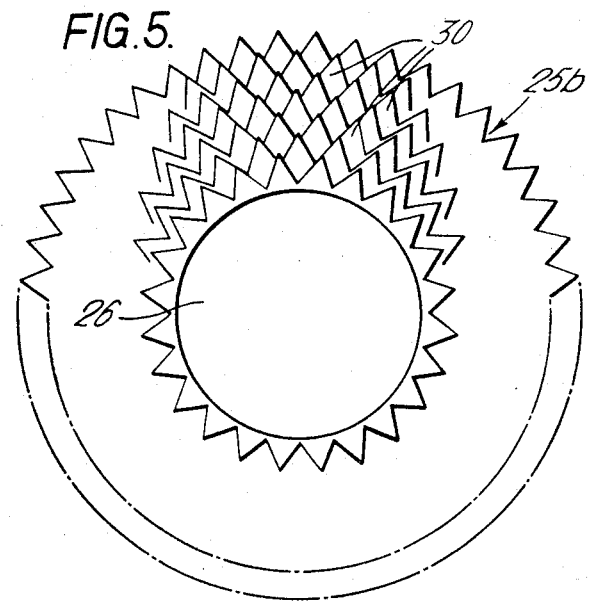
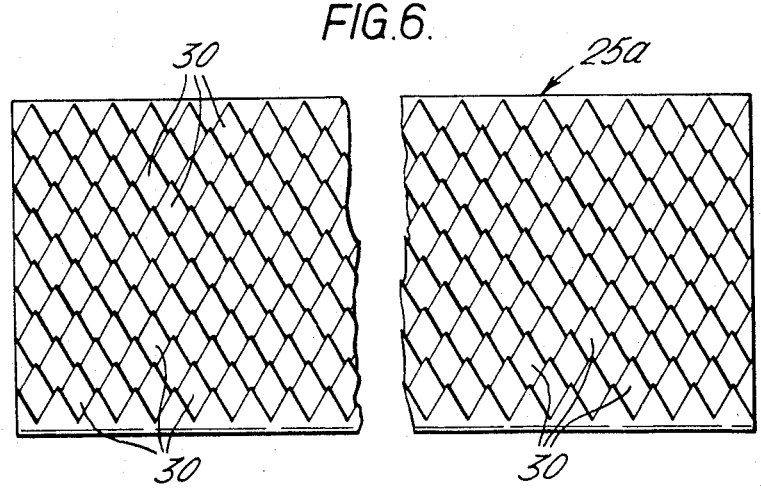

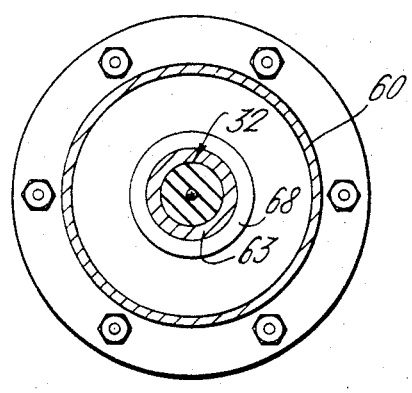
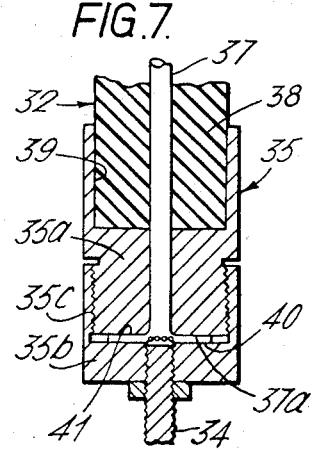
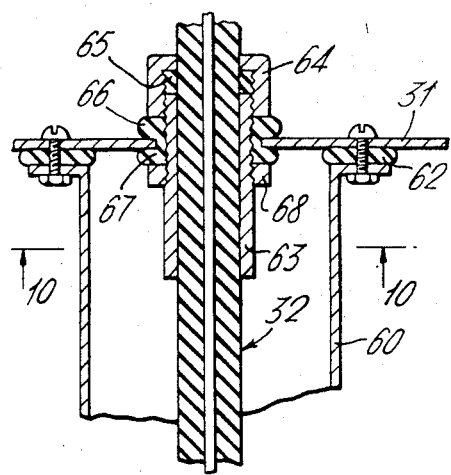
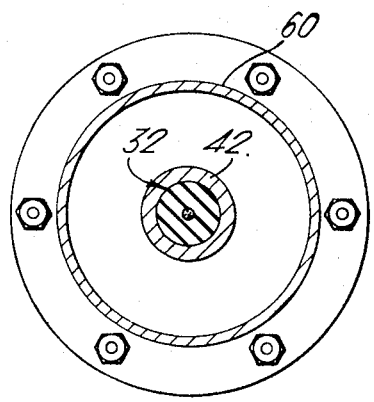

ABSTRACT OF THE DISCLOSURE

A method for removing oil from water by passing the liquid through a high voltage electrostatic field within a highly dielectric solvent.

---

This application is a divisional of my co-pending application Ser. No. 201,705 filed June 11, 1962 and now abandoned.

This invention relates to a method for removing oil and foreign bodies from water, and more particularly, to a method of simplified form utilizing an induced electrical field within a dielectric solvent with which the water containing oil and other foreign bodies is treated.

Polluted industrial waste liquids from machine shops, oil refining plants, cooling plants, steel plants and the like, while mainly water, contain contaminating components such as oil, color bodies, grit and other insoluble impurities. Such waste liquids have to be treated to remove their contaminating impurities before the water is circulated repeatedly or their waters are suitable to be released from sewers into streams in treated non-polluting condition. On the other hand, we are often confronted with the problem of extracting useful substances from industrial waste liquids, for example, separating wool grease from wool scouring waste liquid.

Such waste liquids as above usually contain stable emulsions of the oil-in-water type. The emulsion-forming film often has little tendency to dissociate or may become coagulated with age and very resistant to mechanical distortion and dissociation. Resolution of these emulsions is accomplished only with difficulties. This invention is directed to improvements in methods for separation of oil and water mixtures or emulsions with use of an organic solvent capable of dissolving oil as filter liquid. I have discovered that when such a waste liquid is passed through a high voltage electrostatic field within a highly dielectric solvent, the effectiveness of the dissolution of oil is remarkably enhanced.

The application of a high differential of electrical potential to a waste liquid within a dielectric substance causes separation of water, oil and other insoluble impurities due to dielectrophoresis. The emulsions containing a water phase and oil phase are dissociated or resolved into small particles without emulsion-forming film, whereby oil contained in the waste liquid may be brought into intimate contact with the solvent, which is the dielectric substance according to the invention, to be dissolved therein.

Accordingly, it becomes a primary object of this invention to provide a method for electrically dissociating oil and water mixtures or emulsions within a dielectric solvent capable of dissolving oil whereby oil contained in the mixture or emulsions is brought into intimate contact with the solvent to be completely dissolved.

Another object of this invention is the provision of an improved system for the separation of oil-water emulsions by dielectrophoresis phenomenon.

Another object of the invention is to provide an improved method for removing oil and other foreign bodies from water through the utilization of a liquid filter which is substantially stationary.

A further object of the invention to provide a separator basin or chamber into which the oily waters are fed, and from which clarified waters are released, while oil is separated from the infed waters, dissolved into a solvent within the chamber and then drawn off together with the solvent. According to the invention this water layer is drawn off continuously, so it is also an object of this invention to devise ways and means for drawing off the water automatically and continuously.

During separating operation, floatable particles rise and collect as an impurity layer thereon that is fluctuating as to its depth. It is also an object of the invention to provide means for discriminatingly discharging the impurities from the layer thereof.

A still further object of the invention is to provide improved means whereby oil and other foreign bodies may be substantially completely removed from wool scouring waste liquid and whereby recovery of lanoline may be accomplished more effectively than has hithertofore been possible.

The best embodiment of the invention now known to me is shown in the accompanying drawings but it is to be understood that this showing is illustrative and not limiting because obviously changes can be made both in detailed construction and arrangement of parts without departing from the spirit and scope of this invention, whose metes and bounds are defined in the appended claims. But it is to be recalled that equivalents are also contemplated so long as they are equivalents of the elements used or of the conjointly cooperative functioning thereof.

The invention will be more clearly understood from the following detailed description of specific examples thereof read in conjunction with the accompanying drawings which form a part of this specification and in which:

FIG. 1 is a schematic, vertical sectional view of apparatus for carrying out the method embodying the present invention;

FIG. 5 is a plan view from the bottom on an enlarged scale of the outer electrode illustrated in section in FIG. 1;

FIG. 6 shows a development of the inner surface of the cylindrical portion of the outer electrode illustrated in section in FIG. 1;

FIG. 7 is a vertical sectional view on an enlarged scale of the liquid sealed tube, taken on line 8—8 of FIG. 1;

FIG. 8 is a transverse sectional view taken on line 8—8 of FIG. 1;

FIG. 9 is a vertical sectional view of a liquid sealed tube in a modified form, partly cut off;

FIG. 10 is a transverse sectional view of FIG. 9 taken on line 10—10.

Figure 1A:
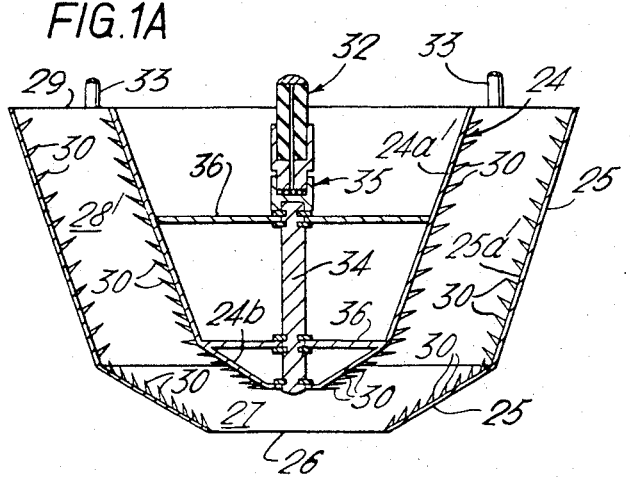
FIG. 1A is a vertical sectional view of a pair of electrodes in a modified form.

Referring now to FIG. 1, there is illustrated a filtering tank or tower 11, in which a filter liquid is contained. According to the invention the filter liquid is a highly dielectric solvent which is capable of dissolving oil therein. The specific gravity of the dielectric solvent may be higher than water. Usually such an organic solvent as perchloroethylene (tetrachloro ethylene) or trichlene (trichloroethylene) is preferred.

The tank 11 is provided with a solvent inlet 12 below the level 13 of the solvent layer 14 and a solvent outlet 15 at the bottom of the tank 11. 16 is a solvent supply pipe or conduit which is connected to the inlet 12. The outlet 15 is connected to two line branches 17 and 18, the former being a drain branch and the latter a waste branch. The drain branch 17 extends up to the level 13 of the solvent layer 13 so that the level 13 of the solvent layer 13 may be maintained at a predetermined height. The waste branch 18 is provided with a hand valve 19 through which, when opened, heavier settled solid particles are removed from the bottom of the tank 11.

Figure 2:
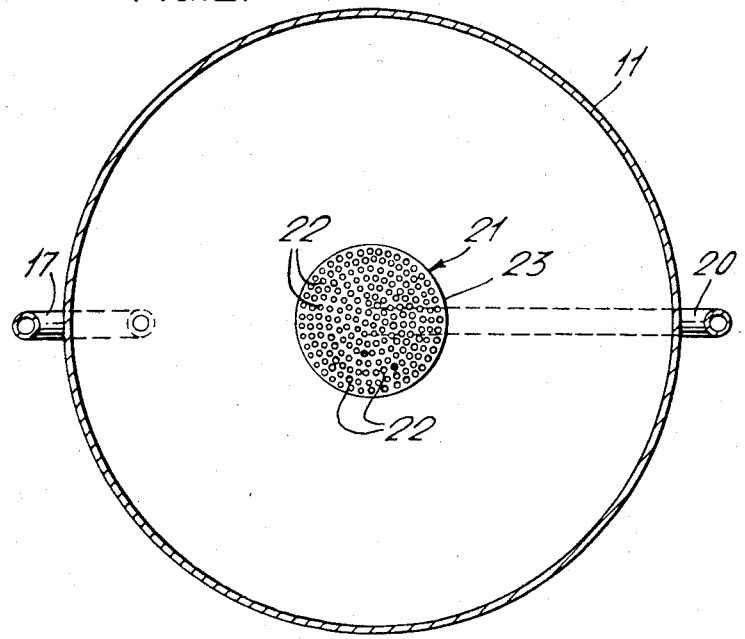
FIG. 2 is a transverse sectional view taken on line 2—2 of FIG. 1.

The liquid to be filtered is led by way of a pipe or conduit 20 to the bottom of the tank 11 at the center and there introduced into the layer of the dielectric solvent. 21 is a nozzle which is connected to the above mentioned pipe 20 and opens into the dielectric solvent layer 14. The nozzle 21 may be formed with a multiplicity of orifice-like holes 22 spaced throughout a circular plate 23 as shown in FIG. 2 so that the liquid to be filtered may be issued in the form of a multiplicity of droplets out of these holes 22 into the solvent layer 14.

The tank 11 is provided with another two outlets 46 and 47 above the level 13 of the solvent layer 14. During the filtering operation water and floatable impurities are separated from the solvent to be in layers thereon. For example, the floatable impurity layer 49 is formed on the solvent layer 14 and the water layer 50 then on the floatable impurity layer according to the differences in specific gravity, respectively. The floatable impurities and water are removed through the outlets 46 and 47, respectively. The level 51 of the intermediate layer of floatable impurities is maintained at a predetermined minimum by movement of the float 52 which controls the valve 53 with which the outlet 46 is provided. 54 is the operating lever connecting the float 52 to the valve 53. The treated water may overflow through the outlet 47. 55 is the level of the treated water.

According to the invention, a pair of electrodes, namely, an inner electrode 24 and an outer electrode 25 which may be the cathode and anode with D.C., respectively, are located within the solvent layer 14, the former being centrally located and surrounded by the latter. Both electrodes are made of conducting material such as stainless steel. The inner electrode 24 may be a hopper-like body consisting of a vertically extending cylindrical portion 24a and a conical portion 24b incorporated therewith. Similarly, the outer electrode 25 may consist of a vertically extending cylindrical portion 25a and a conical portion 25b incorporated therewith, however said conical portion being truncated to form a relatively larger opening 26 at its apex. The vertical angles of the conical portions 24b and 25b are the same and may be an angle within the range from 120° to 150°, preferably, about 140°. The electrodes 24 and 25 are concentrically arranged within the solvent layer 14 on the vertical center line of the tank 11, their top openings being aligned on a horizontal level to form an annular opening 29 between them. In the above manner, a sloped zone 27 is formed between the inner and outer conical portions 24b and 25b and a vertically extending zone 28 between the inner and outer cylindrical portions 24a and 25a. The opening 26, zones 27 and 28, and annular opening 29 constitute a continuous flow passage.

Figure 3:
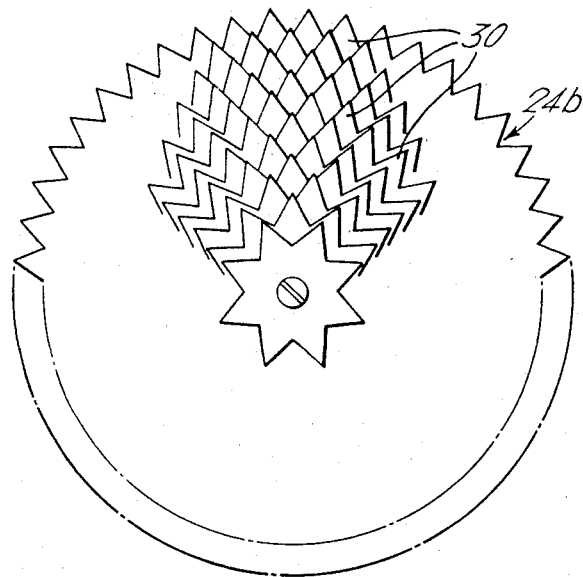
FIG. 3 is a plan view from the bottom on an enlarged scale of the inner electrode illustrated in section in FIG. 1.
Figure 4:
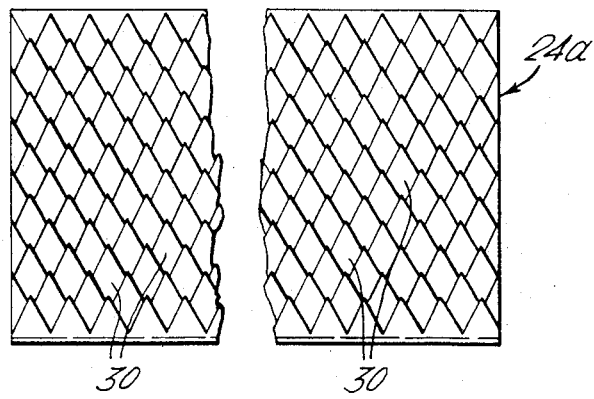
FIG. 4 shows on an enlarged scale a development of the outer surface of the cylindrical portion of the inner electrode illustrated in section in FIG. 1.

According to the invention, the surfaces of the two electrodes 24 and 25, on opposite sides of the zones 27 and 28, namely, the outer surface of the inner electrode 24 and the inner surface of the outer electrode 25 are covered with small electrode tips 30. The electrode tips 30 are directed upwardly and outwardly on the portion 24a, slightly upwardly and outwardly on the portion 24b, upwardly and inwardly on the portion 25a, and, upwardly and slightly outwardly on the portion 25b. The electrode tips 30 may be formed in an equilateral triangle, for example, having a length of about 1.0 centimeter in each side, and, preferably, arranged in tiers and in staggered relationship for each adjoining two tiers, as shown in FIGS. 1, 3, 4, 5 and 6. FIGS. 3 and 5 are plan views from bottom of the conical portions 24b and 25b, respectively, and the cylindrical portions 24a and 25a, respectively.

The electrodes may be shaped in any other forms. FIG. 1A shows a modified form of the electrodes, in which a sloped zone 28' is substituted for the vertically extending zone 28 illustrated in FIG. 1. The sloped zone 28' is formed with a pair of truncated cones 24a' and 25a' having a relatively small vertical angle which may be within the range of 20° to 60°, preferably, about 40°. The zone 27 may be formed in the same manner as disclosed with reference to FIG. 1. In FIG. 1A, reference characters similar to those in FIG. 1 designate corresponding parts. The differences in operation between both embodiments illustrated in FIGS. 1 and 1A will be referred hereinafter.

Referring to FIG. 1 again, the inner electrode 24 is suspended from a sleeve 43 which is mounted on the cover plate 31 of the tank 11 with a current carrying cable 32. More particularly, the inner electrode 24 of a hopperlike body is provided with a central rod 34 which is aligned and connected by a connector 35 with a current carrying cable 32. With numeral 36 are indicated support members which connect the central rod 34 to a hopper-like body of the inner electrode 24. Both the central rod 34 and support members 36 are made of conducting material such as stainless steel. The current carrying cable comprises a conductive wire 37 covered with a highly insulated material 38 such as polyethylene.

Electrical connection of the central rod 34 to the current carrying cable 32 is illustrated in detail in FIG. 7. The connector generally indicated with the numeral 35 consists of a mouthpiece 35a and a cap nut 35b, both of conducting material, jointed by screw threading 35c. The mouthpiece is formed with the inner bore 39 fixedly receiving the end of the current carrying cable 32, while the cap nut 35b is fixed to the central rod 34 by screw threading. The wire 37 of the cable 32 penetrates the mouthpiece 35a and is exposed between the outer end 40 of the mouthpiece 35a and the inner end 41 of the cap nut 35b. The stripped end 37a spreads radially between the top end 40 of the mouthpiece 35a and the inner end 41 of the cap nut 35b. When the mouthpiece 35a is screw threaded into the cap nut 35b up to the upmost extent, the wire of the cable 32 comes into electrically close contact with the cap nut 35b.

The current carrying cable 32 extends upwardly along a guide tube 42 which may be of insulating material, penetrates the cover plate 31 at a flange sleeve 43 and is then connected to a high D.C. voltage source, as shown in FIG. 1. The guide tube 42 extends vertically and is fixed to the plate cover 31 so that the cable 32 may be vertically supported. The lower end of the guide tube 42 opens into the solvent layer 14 while the top end of the guide tube 42 is liquid sealed with a packing 44 and a gland nut 45.

On the other hand, the outer electrode 25 is also suspended from the cover plate 31 with several longitudinally extending support members 33 of the conducting material such as stainless steel. Both the tank 11 and cover plate 31 are also made of conducting material such as stainless steel as well, and grounded at 34 and 35, respectively.

When a high D.C. voltage is thus applied between the inner and outer electrodes, an electrostatic field is produced within the dielectric solvent layer 14. The voltage drop across the electrodes 24 and 25 is for example, about fifty kilovolts in case of a distance between the electrodes of approximately five centimeters (i.e. about 10 kilovolts per centimeter). The current carrying cable 32 is also surrounded by a cylinder 60 which is filled with non-conducting gas such as air, which has a high pressure. The top of the cylinder 60 is enclosed while the bottom opens into the layer of the dielectric solvent 14. The level 59 in the cylinder 60 is lowered from the usual level 13 due to the air pressure. The cylinder may be incorporated with the guide tube 42 in one body as shown in FIG. 1. The combined body of tube 42 and cylinder 60 is fixed by a connector 61 to the cover plate.

FIGS. 9 and 10 illustrate a modified form of means for suspending the cable 32 from the cover plate 31 and a modified form of the air sealed cylinder. In FIGS. 9 and 10, the air cylinder 60 is directly mounted to the cover plate 31 with use of a seal packing 62. The cable 32 is fixedly fitted within a tube 63 which is sealed by a pair of nuts 63 and 64 to the cover plate 31 at the central opening. 65, 66 and 67 are the packing for sealing the air cylinder 60.

A filtering operation is described herein below by way of example in case of the filtering of the wool scouring waste liquid. The waste liquid is introduced through the pipe 20 into the tank 11 at its bottom. The tank 11 contains a filter liquid which is capable of dissolving oil. According to the invention, the filter liquid is a highly dielectric solvent, for example, perchloroethylene having the properties of a specific gravity of 1.623 at 20 to 24° C. solubilities of 0.015% solvent in water at 25° C. and 0.01% water in solvent at 25° C. a dielectric constant of 2.365 at 25° C. and a specific resistance of $1.8 \times 10^{13}$ ohm/cm.

The inflow of the waste liquid out of each hole 22 of the nozzle into the tank may be in no sense jets or stream but merely a floating of a multiplicity of droplets. The droplet sizes and the length of the streamlined flow depends on the size of the holes. The waste liquid in the form of a multiplicity of droplets rises in the solvent layer 14 through the opening toward the lower end of the inner electrode 24, namely the apex of the conical portion 24b by the difference in specific gravity between the waste liquid and solvent conjointly with the influence of attractive force of the cathode (inner electrode 24). The apex of the conical portion 24b is spaced from the nozzle with such a distance that any dielectric breakdown never occurs. Since a high D.C. voltage is applied between the inner and outer electrode 24 and 25, the droplets are electrified on arrival at the conical electrode 24b and combined each other into a film. The waste liquid thus charged is shuttled in the form of small particles from each electrode tip 30 of the inner conical portion 24b toward the outer conical portion 25b and in turn from each electrode tip 30 of the outer conical portion 25b toward the inner conical electrode 24b. In repeating the above operation water, oil and other impurities are gradually separated due to dielectrophoroesis, even water and oil emulsions being dissociated. The electrical potential necessary for this separation purpose depends upon the nature of the waste liquid, the dielectric properties of oil, the ionization potential of the water particles and the distance between the electrodes. It is common to express the electrical potential in voltage gradients, namely the number of volts applied per linear centimeter of distance between electrodes. The voltage gradients may be from 5 to 20 kilovolts per centimeter, preferably, about 10 kilovolts per centimeter. There is very little flow of electrical current, usually less than 40 microamperes because highly dielectric solvent is used.

With the provision of small tips 30 on the whole surfaces of the electrodes 24 and 25, the effectiveness of the separating operation is remarkably enhanced, whereby wool grease contained in the waste liquid can be brought into intimate contact with the solvent to be dissolved therein. The upward directing of the tips 30 prevents water to be impounded at any place and the staggered arrangement of the tips 30 in adjoining tiers prevents any straight rising flows of the waste liquid. These features also participate in enhancement of the effectiveness of the separating operation.

The inner and outer electrodes 24 and 25 have a function as baffle boards. The waste liquid while subjected to the above dielectrophoresis, moves from the sloped zone 27 to the vertically extending zone 28 where the dielectrophoresis may vary into substantially horizontal directions. The sloped zone 28' illustrated in FIG. 1A is advantageous in comparison with the vertical zone 28 in that straight upward flows can be practicably prevented.

In the above manner, wool grease contained in the waste liquid is completely separated from the waste liquid in the electrostatic field (zones 27 and 28) within the solvent layer 14 and immediately dissolved therein. Simultaneously, other insoluble impurities such as dandruff, dirt, earth and sand can be separated from water due to the above dielectrophoresis. Heavier settled particles may be removed through the waste branch 18 from the bottom of the tank 11. Floatable particles such as dandruff rise through the annular opening 29 and collect as a floating impurity layer 49 on the solvent layer 14. The floating impurities may be discriminatingly removed through the outlet 46 by movement of the float 52. The clarified water also rise and form a water layer 50 on the floating impurity layer 49. The clarified water may overflow through the outlet 47. The solvent retaining wool grease may be drawn off through the drain pipe 17. The introduction and discharge of the water and the solvent may be carried out under continuous flow conditions. The solvent may also be circulated.

In the continuous or long operation there is a problem of electrical leakage along the current carrying cable from the inner electrode 24 to the clarified water layer 50. This occurs due to the fact that somewhat conductive impurities are accumulated on the insulating material 42 of the cable 32 and causes short circuiting. According to the invention, this leakage can be perfectly prevented by surrounding the cable 32 by an air-sealed cylinder 60 which is filled with compressed air and whose bottom opens into the solvent layer 14.

What I claim is:

1. A method for removing oil and foreign bodies contained in lesser amounts from a body of water, comprising:
    providing a substantially stationary layer of dielectric solvent capable of dissolving oil and having a specific gravity greater than that of water,
    mounting a pair of electrodes within said layer of dielectric solvent,
    supplying a high voltage, unidirectional, electric potential to said pair of electrodes so as to produce an electrostatic field therebetween within said layer of dielectric solvent,
    forming said body of water containing said lesser amounts of oil and foreign bodies into a multiplicity of droplets,
    passing said droplets of water containing said lesser amounts of oil and foreign bodies through said electrostatic field within said dielectric solvent,
    repeatedly shuttling said droplets back-and-forth at high speed within said electrostatic field so as to separate said droplets into progressively smaller particles until the oil and foreign bodies are disassociated from the water,
    whereby the disassociated oil is dissolved by said solvent and the water separated therefrom forms a substantially discrete clarified water layer above said dielectric solvent layer.

2. Method for removing oil and foreign bodies from water according to claim 1, in which the water containing oil and other foreign bodies is continuously introduced into said dielectric solvent layer from its bottom and clarified water is continuously discharged from said clarified water layer formed above said dielectric solvent layer.

3. Method for removing oil and foreign bodies from water according to claim 1, in which said dielectric solvent is introduced through an inlet below the level of said dielectric solvent layer and discharged from the bottom of said dielectric solvent layer.

References Cited

UNITED STATES PATENTS

| | | | |
|---|---|---|---|
| 465,822 | 12/1891 | Lowden | 204—186 |
| 744,171 | 11/1903 | Davis et al. | 204—186 |
| 1,838,850 | 12/1931 | Lawrason | 204—189 |

HOWARD S. WILLIAMS, *Primary Examiner.*

T. TUFARIELLO, *Assistant Examiner.*